United States Patent
Magee et al.

(10) Patent No.: US 11,231,689 B2
(45) Date of Patent: Jan. 25, 2022

(54) LOSS PREVENTION DEVICE TRIGGERED BY FREEFALL

(71) Applicants: Sam Hunter Magee, Cambridge, MA (US); Tal Achituv, Cambridge, MA (US)

(72) Inventors: Sam Hunter Magee, Cambridge, MA (US); Tal Achituv, Cambridge, MA (US)

(*) Notice: Subject to any disclaimer, the term of this patent is extended or adjusted under 35 U.S.C. 154(b) by 0 days.

(21) Appl. No.: 15/628,633

(22) Filed: Jun. 20, 2017

(65) Prior Publication Data

US 2017/0364047 A1 Dec. 21, 2017

Related U.S. Application Data

(60) Provisional application No. 62/352,513, filed on Jun. 20, 2016.

(51) Int. Cl.
| | | |
|---|---|---|
| *G01F 15/08* | (2006.01) | |
| *G05B 15/02* | (2006.01) | |
| *H04M 1/18* | (2006.01) | |

(52) U.S. Cl.
CPC ............ *G05B 15/02* (2013.01); *H04M 1/185* (2013.01); *F16F 2230/0023* (2013.01)

(58) Field of Classification Search
CPC . G06F 1/1656; G06F 2200/1633; H02H 6/00; H02H 7/20; Y10T 29/49004; B64D 17/62; G05B 15/02; H04M 1/0202; H04M 1/185; H04M 2250/12; H05K 5/0086; H05K 5/0217; F16F 2230/0035; F16F 2230/06; F16F 2230/10; F16F 2230/24; H04B 1/3888

See application file for complete search history.

(56) References Cited

U.S. PATENT DOCUMENTS

| | | | |
|---|---|---|---|
| 3,724,373 A | 4/1973 | Rivenes | |
| 3,921,944 A | 11/1975 | Morrison | |
| 5,825,667 A | 10/1998 | Broek | |
| 7,059,182 B1 * | 6/2006 | Ragner | H05K 5/0086 |
| | | | 73/200 |
| 8,205,822 B1 | 6/2012 | Jameson et al. | |
| 8,519,858 B2 | 8/2013 | Tysowski et al. | |
| 8,903,519 B2 | 12/2014 | King et al. | |
| 2014/0253284 A1 * | 9/2014 | Peterson | H04B 1/3888 |
| | | | 340/3.1 |
| 2014/0304952 A1 | 10/2014 | Mathews et al. | |
| 2015/0331456 A1 * | 11/2015 | Moon | G06F 1/1656 |
| | | | 361/51 |

* cited by examiner

*Primary Examiner* — Dionne Pendleton
(74) *Attorney, Agent, or Firm* — Gearhart Law, LLC; David Postolski, Esq.

(57) ABSTRACT

Disclosure are various embodiments of a loss prevention device responsive to freefall. The loss prevention device can be integrated into any object and incorporates physical, mechanical, and/or electrical modules configured to prevent the likelihood that dropping the object causes injury to persons or damage to structures in the vicinity. Such modules may constitute continuous or discrete, static or dynamic portions of the housing of the loss prevention device. Other modules may incorporate electromechanical components that allow for effective manipulation of the motion of the loss prevention device and the coupled object. The device can be configured to deploy said modules upon detecting freefall. In some cases, the device incorporate a release mechanism that facilitates said deployment.

8 Claims, 5 Drawing Sheets

LOSS PREVENTION DEVICE TRIGGERED BY FREEFALL

CLAIM OF PRIORITY

This application claims priority to U.S. Provisional Patent Application Ser. No. 62/352,513, filed Jun. 20, 2016, the entire disclosure of which is hereby expressly incorporated by reference herein.

FIELD OF TECHNOLOGY

This disclosure relates generally to safety devices and, more particularly, to a device and method of manipulating the motion of a fallen object during freefall to prevent loss.

BACKGROUND

Evolved organisms have developed structural features for manipulating their motion during freefall. One example is a samara, which is a fruit that covers some seeds (e.g. maple seed), which enables the seed to descend slowly to the ground and/or be carried by the wind. In certain hazardous environments such as construction sites, there is a considerable risk that an object, such as a tape measure, may fall and seriously injure or kill a human being, cause infrastructure damage, or trigger a chain reaction of events leading to disastrous losses. Current solutions involve tethering tools or attachment points that are designed to prevent the object from dropping in the event that a grasp on the object is lost. However, in the case that an object is already in freefall, these solutions provide no remedy. Additionally, current tools are not always manufactured or designed to prevent loss, especially loss caused by accidentally dropping said tools from a great height.

Safety nets may prevent falling objects from causing injury. However, safety nets are immobile and may not actually prevent injury to an individual not positioned below the safety net. Other safety methods involve behavioral guidelines, such as the grab-and-twist method, which involves registering a twist in an object during hand off of the object. However, behavioral methods can fail due to lack of training or due to human error. Furthermore, behavioral methods can fail due to human fallibility and are not reliable especially during the split-second windows when loss can be prevented.

Thus, there remains a considerable need for devices and methods that can manipulate the motion of an object in freefall to aid in loss prevention without requiring human input.

SUMMARY

Disclosed are various embodiments of a loss prevention device that can be integrated into an object to manipulate the object's motion upon detecting a state of freefall.

In one aspect, a device comprises one or more loss prevention modules. The loss prevention module(s) incorporate one or more physical features and/or one or more electrical components. The loss prevention module(s) are adapted to prevent loss in an environment surrounding the device while the device is in freefall.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, a system and/or a device for manipulating the motion of an object in freefall to aid in loss prevention without requiring human input.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Elements described herein as coupled may have a direct or indirect connection with one or more other intervening elements.

Definitions

'Loss prevention' refers to any practice(s) imposed to reduce the risk of causing personal injury or structural damage.

'Loss prevention module' refers to any physical or electrical component that may be utilized to aid in loss prevention. A loss prevention module may be an intrinsic feature that needs no deployment process. Or a loss prevention module may need to be deployed.

'Housing' refers to an outer covering of a device having any shape, size, or physical properties. A housing is typically used as a protective element, but as used herein, may also incorporate functional components. For example, a particular physical property of the housing may allow it to be intrinsically functional and incorporate solutions to deficiencies in the prior art.

In some embodiments, 'penetrable layer' refers to a continuous or discrete portion of a housing that may be opened or ruptured to deploy a loss prevention module. Also, 'penetrable layer' may refer to a hollow aperture of the housing.

Disclosed are various embodiments of a loss prevention device that can be integrated into an object to manipulate the object's motion upon detecting a state of freefall.

In one embodiment, the device may be adapted to decelerate the object during freefall. Alternately or in addition the device may cause the terminal velocity of the object to be reduced significantly, e.g., by exerting a drag force on the object. In the same or another embodiment, the device may be adapted to divert the freefalling object's trajectory, e.g., away from one or more targets or toward a target. In another embodiment, the device may be adapted to absorb the shock of falling or at least prevent shock or injury to objects it strikes.

System Overview

Figure 1:
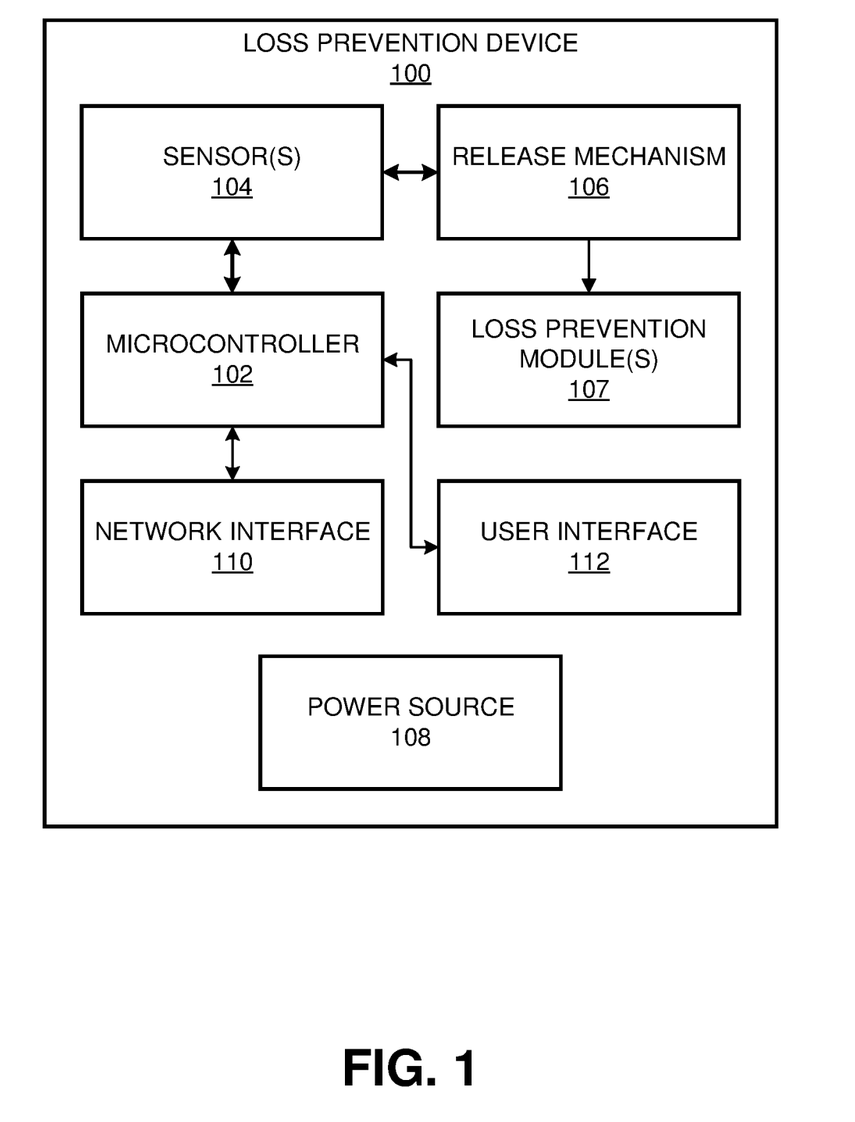
FIG. 1 is a block diagram of an exemplary loss prevention device.

Referring to FIG. 1, a block diagram of an exemplary loss prevention device 100 is shown. In one embodiment, the loss prevention device 100 may comprise a microcontroller 102. The microcontroller 102 incorporates at least one processor and at least one memory, in which memory may be stored one or more instructions executable by the processor. Executing the one or more instructions through the processor causes the loss prevention device 100 to operate components of the loss prevention device 100 (e.g., the sensor(s) 104, the release mechanism 106, the loss prevention module(s) 107), communicate to networked devices through the network interface 110, and/or provide a user interface 112 to facilitate user interaction with the loss prevention device 100.

The loss prevention device 100 may comprise one or more sensors 104 communicatively coupled to the microcontroller 102. The sensor(s) 104 may include, but not be limited to one or more of the group consisting of: an accelerometer, a barometer, a gyroscope, one or more optical sensors, one or more magnetic sensors, a radio transceiver, audio/ultrasonic sensors, infrared sensor (and optionally, an IR emitter), and an airspeed sensor. Other sensors that can contribute to determining absolute and/or relative positions, orientations, and other physical parameters of the loss prevention device 100 may also be used and are within the scope of the exemplary embodiments.

In one embodiment, the microcontroller 102 may be communicatively coupled to a release mechanism 106 adapted to manipulate one or more loss prevention module (s) 107 of the loss prevention device 100. The release mechanism 106 may be analog-based and communications with the microcontroller 102 may be facilitated through a digital-to-analog converter (not shown in FIG. 1). Or the release mechanism 106 may share a digital interface with the microcontroller 102.

Upon detecting freefall through the microcontroller 102, the microcontroller 102 may initialize the release mechanism 106, which subsequently causes the loss prevention module 107 to be deployed. In another embodiment, the loss prevention module 107 may not require the release mechanism 106 to be deployed, e.g., if the loss prevention module 107 encompasses the physical features of the housing, if the loss prevention module 107 automatically deploys on its own during freefall, of if the loss prevention module 107 uses a different mechanism to deploy.

The loss prevention device 100 may also comprise a power source 108 providing power to the various components of the loss prevention device 100. Sources of power include, but are not limited to a DC battery (rechargeable or not), an inertial generator, or a photovoltaic cell. The loss prevention device 100 may additionally comprise a source of compressed gas or may utilize a gas-producing chemical reaction such as those commonly used for inflating airbags. Such sources may provide high-pressure air which may be used to power pneumatic components, deploy one or more loss prevention module(s) 107, and/or provide a means for steering the loss prevention device 100.

In one embodiment, the sensor(s) 104 may comprise an accelerometer capable of detecting force(s) in at least one axis, for example, the vertical axis. The microcontroller 102 may determine that it is in freefall upon detecting substantially zero forces in the vertical axis.

The loss prevention device 100 may also comprise a network interface 110 allowing the microcontroller 102 to establish a connection to a network (e.g., a local area network (LAN), a wide area network (WAN)) and communicate with networked devices. The loss prevention device 100 may additionally comprise a user interface 112 which may incorporate any number of input/output devices such as a touchscreen, a button, an LED, or a speaker. The user interface 112 generally allows a user to interact with the loss prevention device 100, such as to view/modify a configuration of the loss prevention device 100, determine a state of the power source 108, and toggle the loss prevention device 100 on or off.

In another embodiment, the sensor(s) 104 may include a video camera which may generate video data during freefall, which may be processed by the microcontroller 102 to recognize objects, such as objects the loss prevention device 100 should stay away from and/or objects the loss prevention device 100 should veer toward. In a further embodiment, the loss prevention module 107 may incorporate and utilize steering controls, such as rudders and servos, propellers, or compressed gas, to steer the loss prevention device in particular directions.

In another embodiment, the loss prevention device 100 may utilize a radio transceiver to detect levels of radio frequency activity. In a further embodiment, the loss prevention device 100 comprises steering controls and the microcontroller 102 may be configured to steer away from certain types of radio activity, such as WiFi™, cellular, or other types of radio activity that may suggest a human presence or a potential liability.

Structure

Figure 2A:
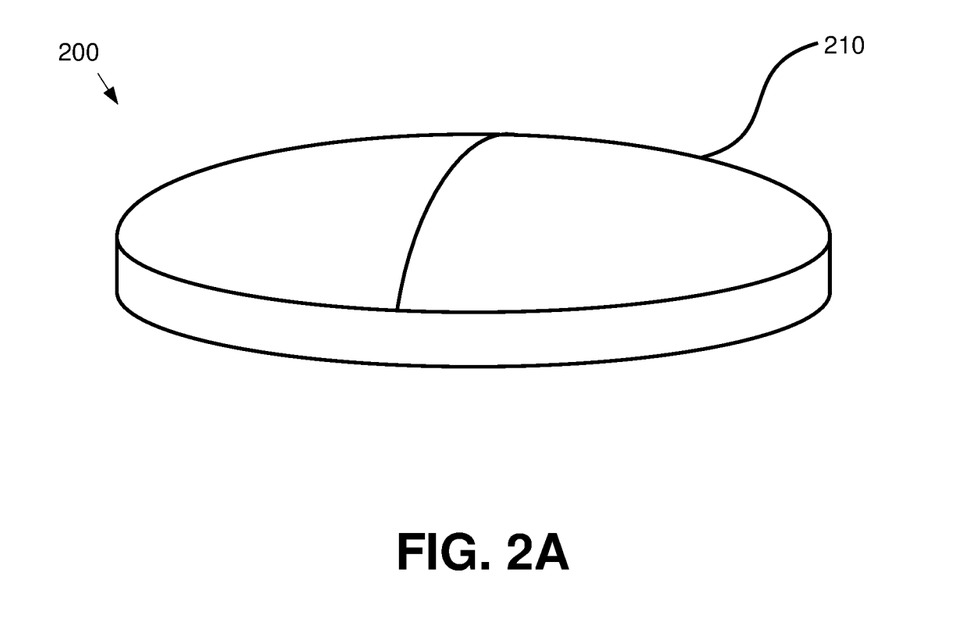
FIG. 2A shows a top perspective view of an exemplary loss prevention device.

Referring to FIG. 2A, a top perspective view of an exemplary loss prevention device 200 is shown. In one embodiment, the loss prevention device 200 may comprise a substantially flat, circular housing 210. Other form factors may be suitable for different environments and are within the scope of the exemplary embodiments described herein. For example, the housing 210 may be a cylinder, a cube, a capsule of any shape, or a manifold of any shape capable of performing the functions of the loss prevention device 200 as described herein.

Figure 2B:
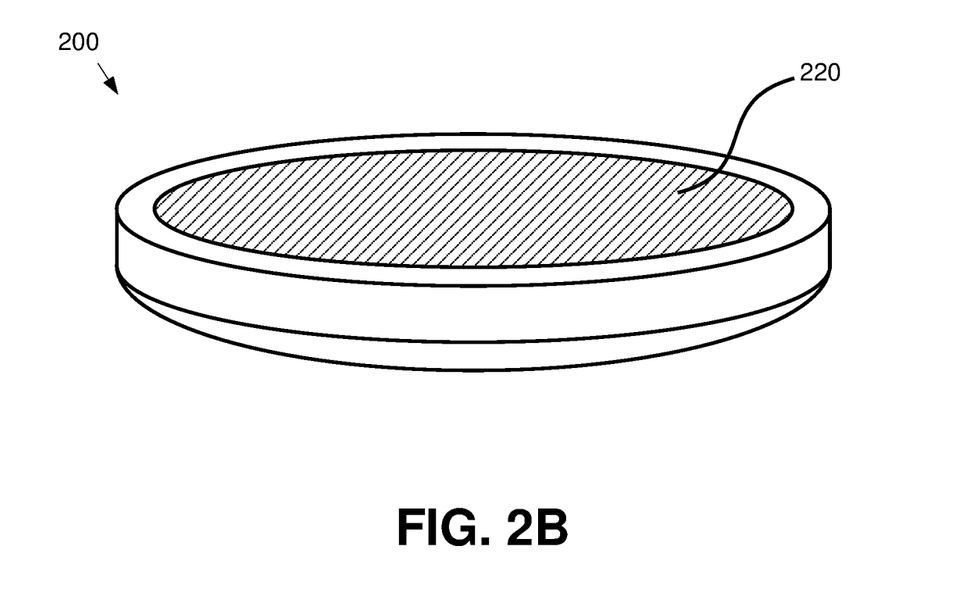
FIG. 2B shows the underside of the loss prevention device of FIG. 1.

Referring to FIG. 2B, a bottom perspective view of the loss prevention device 200 is shown. In one embodiment, the underside of the loss prevention device may comprise an adhesive layer 220. The adhesive layer 220 may be, for example, a double-sided 3M® adhesive or any other double-sided adhesive layer or single layer of glue that may allow the loss prevention device 200 to reliably adhere to a surface of any object. In another embodiment, the loss prevention device 200 may be coupled directly to another object through any coupling means—welding, caulking, threaded fittings, nuts/bolts, twist-ties, zip-ties, magnetic coupling, etc. In yet another embodiment, the housing 210 may be adapted to couple to a mounting bracket (not shown in FIGS. 2A-B) which may be removably coupled to an object, e.g., a surface of the object, and which may be physically configured to receive the housing 210.

Figure 3:
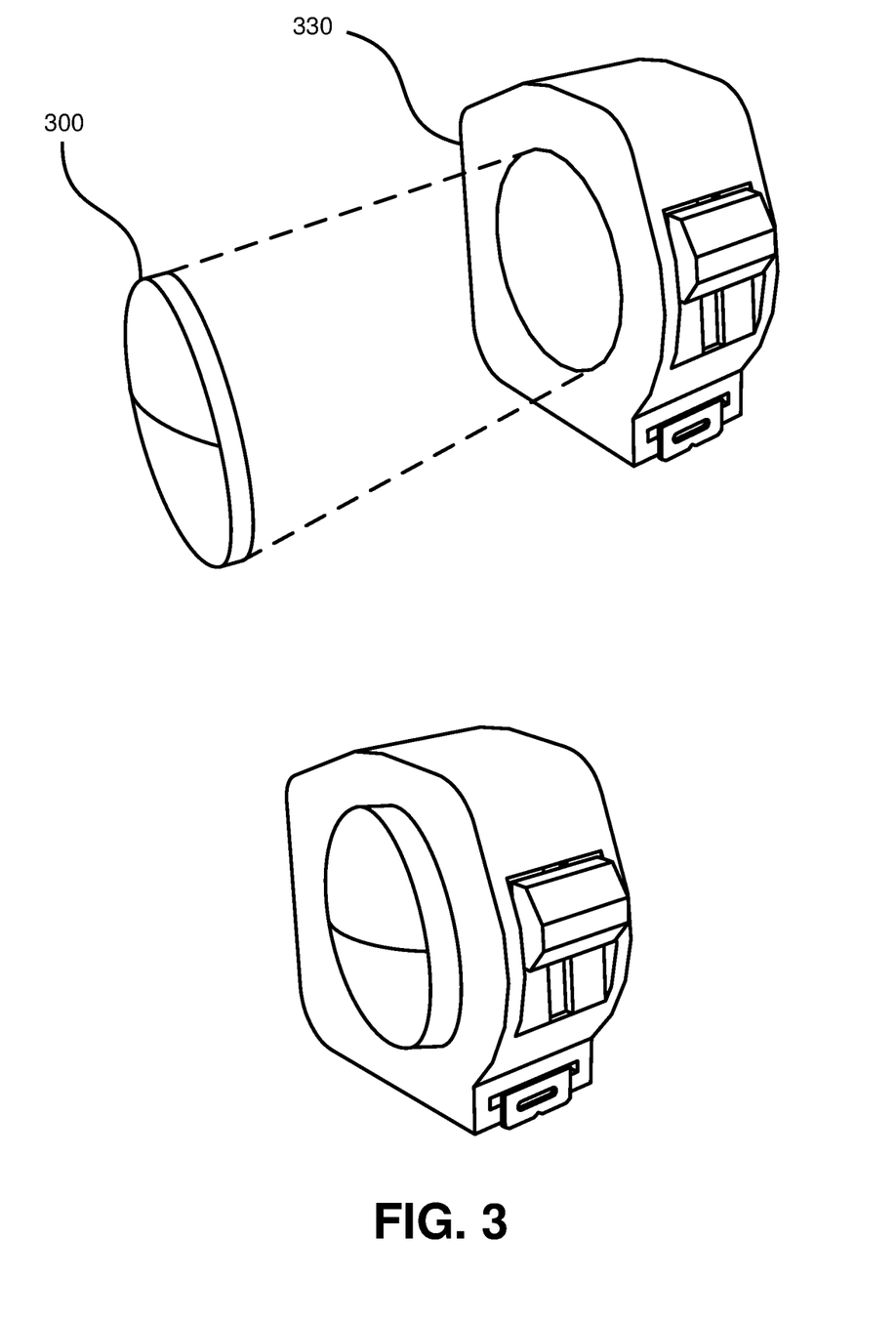
FIG. 3 shows an application schematic of the loss prevention device of FIGS. 2A-B being applied to an object.

Referring to FIG. 3, an application of the loss prevention device 200 of FIGS. 2A-B to an object 330 is shown. In one embodiment, the loss prevention device 300 may be applied to an object 330 (e.g. a tape measure as shown in FIG. 3). For example, the adhesive layer 220 on the underside of the loss prevention device 300 may facilitate the application of the loss prevention device 300 to the object 330. When applied to the object 330, the loss prevention device 300 may stay dormant until the loss prevention device 300 detects, through the sensor(s) 104 therein, that the object 330 (and thus the loss prevention device 300) is in freefall, at which point, the loss prevention device 300 may activate one or more loss prevention modules thereof, if applicable.

Though the object 330 shown in FIG. 3 is a tape measure, it will be appreciated that the loss prevention device 300 may be used with any object. As such, FIG. 3 is meant to be interpreted in an illustrative, not a restrictive sense. Furthermore, it will be appreciated that reference to a construction zone in the current disclosure is also meant to be interpreted in an illustrative, not a restrictive sense, i.e., a construction site is only one of many environments in which loss can be prevented by utilizing the loss prevention device 300. Exemplary settings may include but not be limited to home remodeling, medicine delivery, package delivery by aircraft, package delivery to a residence, and other settings where objects in freefall may cause losses.

In another embodiment, the loss prevention device 300 may be incorporated into the housing of the object 330 itself. For example, the loss prevention device 300 may form a structural component of the housing of the object 330. Or, the loss prevention device 300 may be incorporated into a functional component of the object 330. For example, if the object 330 is a cordless drill (or other battery-operated tool), the loss prevention device 300 may be incorporated into a rechargeable battery of the cordless drill.

In the same embodiment, the loss prevention device 300 may be incorporated as an intermediary component disposed between the functional component and the object (i.e., the cordless drill battery may fit within the loss prevention device 300 which may fit within the object) or the loss prevention device 300 may be an integral component of the functional component or the object. As an intermediary component, the loss prevention device 300 may be adapted to derive power from the functional component and/or the object if the same incorporates a suitable power source.

In some embodiments, the weight, size, or shape of the loss prevention device 300 may be proportional to the weight, size, or shape of the object 330. For example, a tape measure having a weight of 300 grams may not require as robust a loss prevention device as a tape measure of 700 grams. In the same vein, a tool with a long shape (such as a hammer) may require a long loss prevention device. For example, the loss prevention device 300 may be cylindrically shaped and may be integrated into the handle. Or, the long handle of the hammer may incorporate a loss prevention device integrated into its middle section. Alternately, the handle of the hammer itself could be the housing of the loss prevention device. Thus, the loss prevention device can be integrated into any structural component of an object.

In another example, an unwieldy box may have a large size and may require one or more loss prevention devices, such as airbags, parachutes, or air brakes that may be coupled to various portions of the box. Deploying the loss prevention devices(s) may cause the box to stay upright during freefall, absorb a considerable amount of shock, fall more slowly, and/or fall in a different direction.

In yet another embodiment, one or more portions of the loss prevention device 300 may be made of flexible material, allowing the loss prevention device 300 to be flexible in those portions. This may allow the loss prevention device 300 to be more easily integrated into a wide selection of objects, around angles, through apertures, etc.

Thus, in order to facilitate its desired function, the loss prevention device ideally would complement the object for which it is designed. Changes to the loss prevention device that may make it more suitable for particular objects include, but are not limited to, changes in shape, weight, size, surface properties and the loss prevention module's particular mode of operation. Other objects to which the loss prevention device may be applied include, but are not limited to: drones, mobile phones, tablets, and non-explosive projectiles such as rescue buoys.

Figure 4:
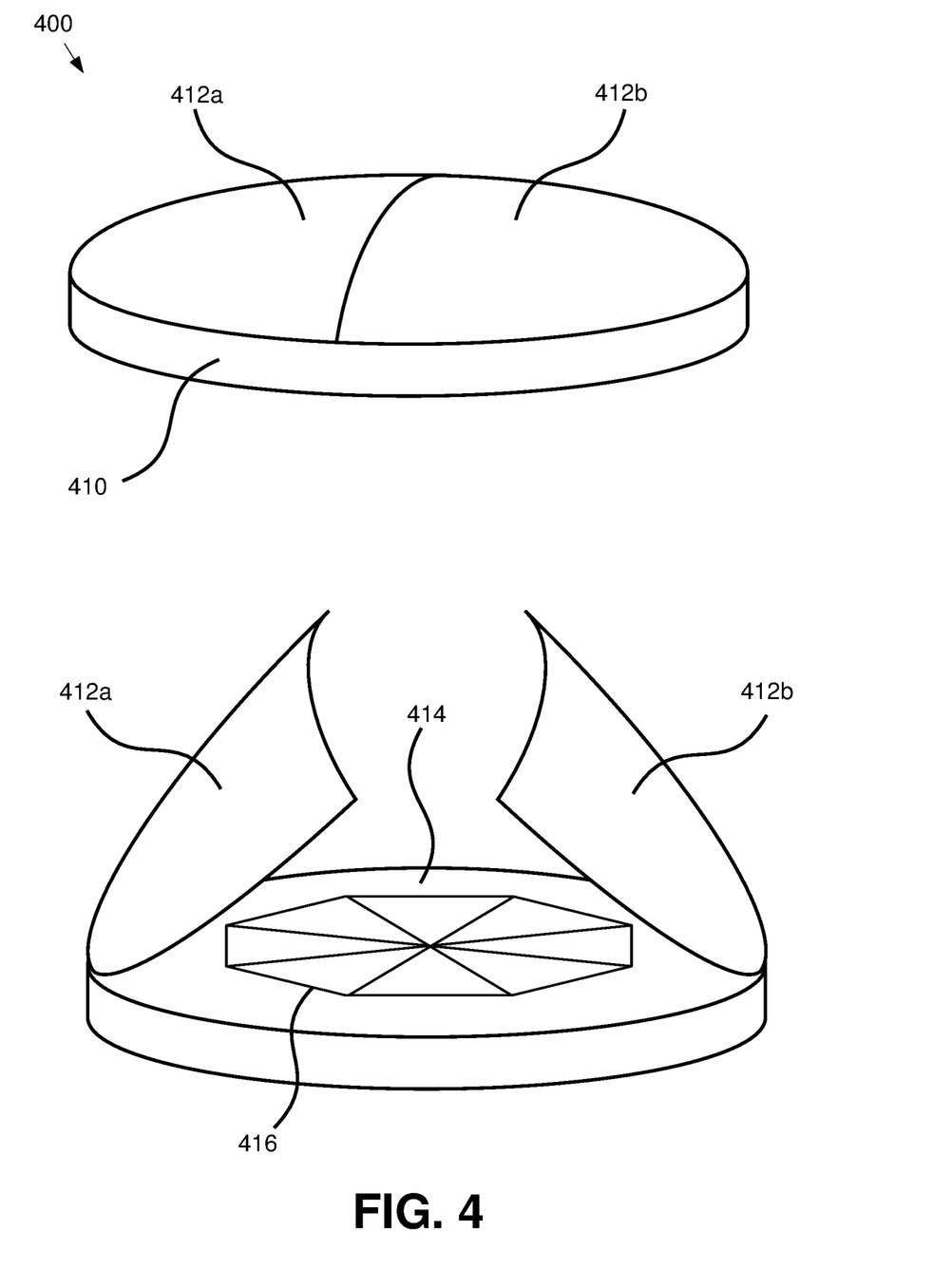
FIG. 4 shows a deployment of the exemplary loss prevention module of FIGS. 2A-B.

Referring to FIG. 4, a deployment of an exemplary loss prevention device 400 is shown. In one embodiment, the loss prevention device 400 may be configured to deploy one or more hatches 412a-b of the housing 410 when the microcontroller detects that the loss prevention device 400 is in freefall. The loss prevention device 400 would be detected as being in freefall if, for example, the microcontroller detects substantially zero forces in a vertical axis through an accelerometer of the loss prevention device 400.

The housing 410 may comprise a penetrable layer 412, which in an embodiment shown in FIG. 4, may constitute one or more hatches 412a-b. The one or more hatches 412a-b may be movable portions of the housing. The hatches 412a-b may be slidable within the housing 410, the hatches 412a-b may hinge away from the housing 410, and/or the hatches 412a-b may be detachable from the housing 410.

In one embodiment, the one or more hatches 412a-b may be movable and when moved (e.g., hinge away from the loss prevention device 400 as shown in FIG. 4), may reveal an inner compartment 414 of the loss prevention device 400 inside which may be disposed a loss prevention module 416.

The loss prevention module 416 may incorporate any mechanical, physical, or chemical means for reducing the likelihood of loss in any environment. In one embodiment, the loss prevention module 416 may be configured to manipulate the motion of the loss prevention device 400 and any coupled objects so as to reduce the likelihood of loss. As shown in FIG. 4, the loss prevention module 416 is a parachute that, when revealed by movement of the hatches 412a-b during freefall, may unfurl, create a significant drag force, and cause the loss prevention device 400 to float safely down. Though the loss prevention module in FIG. 4 is a parachute, other modules may be used to achieve the same results and are within the scope of the exemplary embodiments described herein.

In another embodiment, the loss prevention module 416 may comprise one or more extendable wings that may improve the aerodynamics of the loss prevention device 400 and coupled objects. For example, the wings may be flush against one or more surfaces of the coupled object and may be adapted to hinge at a particular spot and provide lift. Or, the wings may be made of spring steel that can be folded into the inner compartment 414 and expand to full span upon deployment. Improving aerodynamics in this way may generally cause the loss prevention device 400 to translate vertical velocity into horizontal velocity (i.e., move in a direction away from the vertical axis) and/or translate linear velocity into angular velocity (e.g., to generate thrust). In a preferred embodiment, the improved aerodynamics causes the loss prevention device 400 to float and/or spin in the air.

In another embodiment, the loss prevention module 416 may eject an amount of shock-absorbent foam. In another embodiment, the loss prevention module 416 may manifest as a plurality of extendable flaps. The extendable flaps may make up portions of the housing or be stored in the inner compartment 414. In another embodiment, the loss prevention module 416 may be any shock absorber, such as an airbag or balloon or other inflatable object. Any mechanism for increasing the surface area of the loss prevention device 400 or the attached object, increasing drag, improving aerodynamics, absorbing shock, or diverting laterally the movement of the loss prevention device 400 and any combination of mechanisms thereof may be used and deployed as the loss prevention module 416 and is within the scope of the exemplary embodiments described herein.

In another embodiment, the loss prevention module 416 may perform different or additional roles before, during, and/or after deployment. For example, before deployment, the hatches 412*a-b* may be part of the housing 410, but once deployed, the hatches 412*a-b* may be used alone or in concert with other loss prevention modules (e.g., the loss prevention module 416). For example, the hatches 412*a-b* may have a large surface area to drastically increase drag. Additionally, the loss prevention device 400 may comprise a further set of wings folded beneath the hatches 412*a-b*. Whereas the hatches 412*a-b* may provide drag, the wings may be used to steer, or vice versa. In a preferred embodiment, a loss prevention device 400 comprises one or more loss prevention modules to cause the device to spin and/or one or more loss prevention modules to generate lift for the device.

Particular materials that may be used for the loss prevention module 416 or other loss prevention modules may include any natural or engineered material. For example, the parachute loss prevention module 416 shown in FIG. 4 may comprise a thin nylon fabric or a mylar sheet. For wings that generate lift or cause spin, preferred materials are strong, light, foldable, and/or non-brittle.

Figure 5:
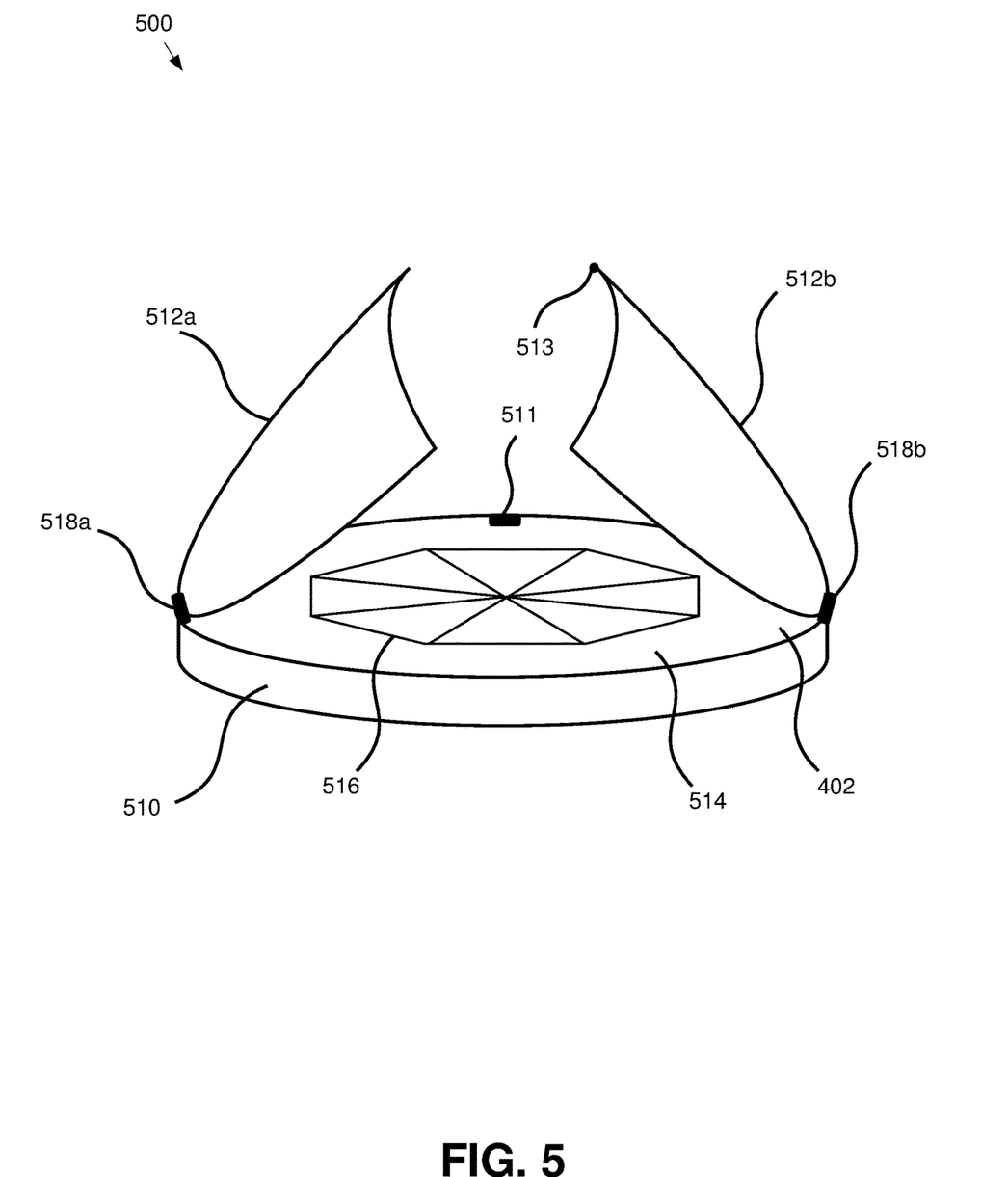
FIG. 5 shows components of the exemplary loss prevention device of FIG. 4 that facilitate the deployment of the loss prevention module.

Referring to FIG. 5, components of the loss prevention device of FIG. 4 that facilitate the deployment of the loss prevention module 516 are shown. In one embodiment, the loss prevention device 500 comprises a penetrable layer that may be modified, broken, or otherwise removed to allow the loss prevention module 516 to deploy. While the loss prevention device 500 is dormant, the penetrable layer serves to protect the internal compartment 514 and contents therein from tampering or the elements.

In one embodiment, the penetrable layer may be acted upon by the microcontroller, another component of the loss prevention device, environmental parameters (e.g., temperature, pressure, moisture) or a precipitating event such as freefall. For example, the penetrable layer may comprise hatches 512*a-b* as shown in FIGS. 4-5 and described above. Once activated, the hatches 512*a-b* may open (i.e., the penetrable layer breaks), allowing the loss prevention module 516 to deploy.

In another embodiment, the penetrable layer may be a continuous portion of the housing 510, in which case the penetrable layer may be broken to deploy the loss prevention module 516, i.e., the penetratable layer may be a tamper-sensitive portion of the housing 510. In a further embodiment, activation of the loss prevention device 500 may be achieved by manually tampering with the penetrable layer, allowing the loss prevention module 516 to be deployable.

In another embodiment, the penetrable layer may be a discrete object or surface coupled to the housing 510 at one or more locations. For example, as shown in FIG. 5, the penetrable layer may comprise hatches 512*a-b*, which hatches 512*a-b* may be coupled to the housing 510 by hinges 518*a-b*, respectively. In a further embodiment, the opening of the hatches 412*a-b* may be facilitated by springs incorporated within the hinges 518*a-b* which may urge the hatches 512*a-b* away from the inner compartment 514. Other mechanisms may be used to urge the penetrable layer away from the inner compartment 514, such as an intrinsic outward bias of the penetrable layer (e.g., the penetrable layer is a noticeable bump) or an applied force push from within or pulling from without the inner compartment 514.

In a further embodiment, a release mechanism (see FIG. 1 at 106) may be incorporated to sever a coupling between the penetrating layer and any part of the loss prevention device 500 (e.g., the housing 510, or the walls of the inner compartment 514). For example, if the coupling is magnetic in nature, the release mechanism may involve a solenoid 511 coupled to the housing 510 within the inner compartment 514 and a magnet 513 coupled to any of the one or more hatches 512*a-b*. Upon detecting freefall, the microcontroller may activate the solenoid, causing the magnet to be repelled and causing the hatches 512*a-b* to open away from the loss prevention device 500 due to the urging of the springs.

In the case of a multi-part penetrating layer and a single tether, the portions of the penetrating layer may be interlocked to prevent any non-tethered portions from being urged away from the loss prevention device while the tether remains.

In yet another embodiment, the loss prevention device may comprise no penetrating layer, e.g., the loss prevention module 516 may deploy through a hollow aperture of the housing 510. Or, the loss prevention module 516 may be disposed on the outer surface of the housing 510 or directly to the coupled object.

After deployment, the loss prevention device 500 may be reset and the loss prevention module 516 may be reused by placing it back in the inner compartment 514 and reestablishing the penetrable layer. Especially if the loss prevention device 500 is determined to be undamaged after deployment, the loss prevention device 500 may provide an economical and reliable drop safety attachment to any object. However, in the case that the loss prevention device 500 is damaged after deployment, it would be inadvisable to reuse the loss prevention device 500 for safety reasons.

Therefore, in one embodiment, the loss prevention device 500 may comprise a component health module. The component health module may be communicatively coupled to any number of individual electronic components of the loss prevention device 500 and may provide a notification through a coupled LED indicator if a component requires servicing. Other health monitoring systems and status checking mechanisms may be used and are within the scope of the exemplary embodiments described herein.

In another embodiment, the housing 510 may be elastic and expandable, and the loss prevention module 514 may utilize a gas-producing chemical reaction, such as those used for inflatable occupant restraint systems. The housing 510 may be any shape and may incorporate any surface properties that may increase the likelihood of loss prevention. For example, when filled, the housing 510 may be spheroidal, cylindrical or comprise one or more elongated portions of any shape. Generally, a total resulting size and/or a resulting rigidity of the housing may be dependent on the particular material(s), fastenings used, feasibility of manufacture, and/or the particular environment the loss prevention device 500 is to be used in.

In a further embodiment, the expansion of the housing 510 may envelop the object attached to the loss prevention device 500. Or, the loss prevention module 516 may be deployed and then inflated to substantially encompass the loss prevention device 500 and the coupled object. For example, the loss prevention module 516 may comprise an inflatable bag. The bag may form the walls of a sphere that, when inflated, expand around the loss prevention device 500 and the coupled object. This may be achieved, for example, by utilizing two hemispherical inflatable bags that, when inflated, wrap around a hollow center in which the loss prevention device 500 and the coupled object would be disposed after deployment. This may have the added effect of containing portions of the coupled object that may loosen and fall off, such as screws, nails, or drill bits.

Although the present embodiments have been described with reference to specific example embodiments, it will be evident that various modifications and changes may be made to these embodiments without departing from the broader spirit and scope of the various embodiments. It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various devices and modules described herein may be enabled and operated using hardware circuitry (e.g., CMOS based logic circuitry), firmware, software or any combination of hardware, firmware, and software (e.g., embodied in a non-transitory machine-readable medium). For example, the various electrical structure and methods may be embodied using transistors, logic gates, and electrical circuits (e.g., application specific integrated (ASIC) circuitry and/or Digital Signal Processor (DSP) circuitry)

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system or microcontroller 102), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A loss prevention device comprising:
    a housing having a first side disposed opposite a second side, wherein at least two movable hatches are attached via hinges to the first side of the housing, and wherein the second side of the housing is configured to affix to an object;
    one or more sensors configured to detect the loss prevention device in freefall, wherein a subset of the one or more sensors comprise one or more magnetic sensors; and
    a release mechanism configured to manipulate a loss prevention module in response to the detection of the loss prevention device in freefall, to deploy the at least two movable hatches of the housing from a closed position to an open position to reveal an inner compartment of the housing and eject an amount of shock-absorbent foam.

2. The loss prevention device of claim 1, wherein a weight, a size, and a shape of the loss prevention device is proportional to a weight, a size, and a shape of the object.

3. The loss prevention device of claim 1, wherein the at least two movable hatches are detachable from the housing.

4. The loss prevention device of claim 1,
    wherein each of the one or more sensors is an optical sensor, a magnetic sensor, an audio sensor, an ultrasonic sensor, an infrared sensor, or an airspeed sensor, and
    wherein each of the one or more sensors comprise a component selected from the group consisting of an accelerometer, a barometer, and a gyroscope.

5. The loss prevention device of claim 1, wherein the housing comprises a shape selected from the group consisting of: a substantially flat and circular shape, a cylindrical shape, a cubic shape, a manifold shape, and a capsule shape.

6. The loss prevention device of claim 1, wherein each of the at least two movable hatches are slidable within the housing.

7. The loss prevention device of claim 1, further comprising:
    a microcontroller incorporating a processor and a memory, the memory being configured to store one or more instructions thereon executable by the processor to cause the loss prevention device to operate the one or more sensors, the release mechanism, and the loss prevention module.

8. The loss prevention device of claim 1, wherein the one or more sensors further comprise: one or more accelerometers, one or more barometers, one or more gyroscopes, one or more optical sensors, one or more radio transceivers, one or more audio/ultrasonic sensors, one or more infrared sensors, and/or one or more airspeed sensors.

\* \* \* \* \*